United States Patent [19]

Wolf

[11] 4,304,508
[45] Dec. 8, 1981

[54] TRANSFER APPARATUS FOR TRANSFERRING ARTICLES IN SUCCESSION

[75] Inventor: Peter Wolf, Wiesbaden-Biebrich, Fed. Rep. of Germany

[73] Assignee: Bellaplast GmbH, Wiesbaden, Fed. Rep. of Germany

[21] Appl. No.: 45,772

[22] Filed: Jun. 5, 1979

[30] Foreign Application Priority Data

Feb. 14, 1979 [DE] Fed. Rep. of Germany ....... 2905616

[51] Int. Cl.³ ............................................. B65G 51/02
[52] U.S. Cl. ..................................... 406/78; 198/459; 198/493; 198/689; 406/79; 406/85
[58] Field of Search ............... 198/459, 460, 493, 689, 198/461; 406/77, 78, 79, 85, 147, 151, 152, 153

[56] References Cited

U.S. PATENT DOCUMENTS

| | | | |
|---|---|---|---|
| 2,481,934 | 9/1949 | Langston | 198/689 X |
| 3,071,236 | 1/1963 | Hahn et al. | 198/493 X |
| 3,086,822 | 4/1963 | Fibish | 406/79 |
| 3,160,443 | 12/1964 | Harris et al. | 406/85 |
| 3,291,282 | 12/1966 | Pedagno | 198/689 X |
| 3,329,469 | 7/1967 | Stadelman | 198/493 |
| 3,351,388 | 11/1967 | Frank | 406/79 |
| 3,477,558 | 11/1969 | Fleischauer | 198/689 X |
| 3,489,407 | 1/1970 | Ackerman | 198/493 X |
| 3,650,566 | 3/1972 | Lee et al. | 198/461 X |
| 3,753,484 | 8/1973 | Aiuola et al. | 198/493 X |
| 3,800,936 | 4/1974 | Anfossi | 198/459 X |
| 3,874,740 | 4/1975 | Hurd | 198/493 X |
| 3,907,095 | 9/1975 | Russell | 198/493 X |
| 3,915,085 | 10/1975 | Lehmann | 198/689 X |
| 4,136,767 | 1/1979 | Sarovich | 198/689 |

Primary Examiner—James L. Rowland
Attorney, Agent, or Firm—LeBlanc, Nolan, Shur & Nies

[57] ABSTRACT

Apparatus for transferring articles, e.g. thermoformed plastic cups along a conveyor and then removing them from the conveyor. To overcome problems of interference between closely positioned cups on the conveyor when removing them, a device is provided to accelerate cups in succession as they approach their position for removal from the device. This acceleration increases the distance between cups and permits sufficient time for their individual removal. In a practical apparatus, the accelerating device is an air nozzle to apply pressurized air along the conveyor and push along the cups.

27 Claims, 10 Drawing Figures

TRANSFER APPARATUS FOR TRANSFERRING ARTICLES IN SUCCESSION

This invention relates to apparatus for transferring articles in succession.

Transfer apparatus of various kinds are known for transporting articles from one treatment station to another or to a suitable location from which they may be packaged.

While it is possible to increase the production or treatment speed of certain articles, e.g. moulded articles, this may raise problems of removing such articles to other stations especially when conveyors are used for this purpose. Such problems may be caused upon removal of the articles from the conveyors when succeeding articles are positioned so closely together that removal apparatus operates at insufficiently high speed to prevent interference between articles being removed and succeeding articles still upon the conveyor. Interference between articles in this way leads to lack of control of the articles by the apparatus which thus cannot perform the function for which it was designed.

An example of this kind of problem is to be found in the controlled transfer of thin-walled shaped articles, for example cups, made by thermoforming from thermoplastic sheet. It is possible with recent manufacturing techniques to increase the speed of manufacture of such thin-walled articles. When manufacturing at high speeds a takeoff conveyor must have a minimum operating speed successfully to remove all of the cups. The cups on the conveyor are closely located together and difficulty is being found in removing them sequentially for stacking purposes as during removal of any one leading cup from the conveyor, the next succeeding cup is moved forward so that a collision between cups occurs before the leading cup has been safely transferred.

According to the present invention, the problem of removing articles from a conveyor while avoiding collisions or interference between articles is solved by accelerating each leading article on the conveyor as it approaches the article removal station. Thus, the leading article is separated from the next succeeding article and arrives at the removal station so as to allow more time for its removal from the conveyor before the next succeeding article is accelerated into the removal station.

A transfer apparatus according to the invention for conveying articles in succession along a feed path comprises a transfer conveyor extending from an article output station of the conveyor to an article removal station for removing articles from the conveyor, and an article separating and feed accelerating device disposed in a position intermediate the onput and removal stations, said device being operable and disposed to apply a force in the direction of travel of the conveyor, in succession to leading articles moving along the conveyor to cause the articles to accelerate beyond the speed of the conveyor towards the removal station and thus to increase their distances from succeeding articles.

The acceleration of the leading articles into the removal station does not aggravate the collision problem as may be supposed as each leading article is accordingly allowed more time for its removal from the conveyor as mentioned above. Also, it is possible to use the acceleration of the articles to assist in their removal from the conveyor so that there is an insignificant time lapse between acceleration along the conveyor and removal therefrom.

The article separating and feed accelerating device may be a mechanical handling device such as a pair of gripping belts opposed across the conveyor for gripping articles between them as they move between the belts. These belts would move at a rate faster than the conveyor to produce the acceleration of articles into the removal station. However, for conveying lightweight articles, preferably the separating and feed accelerating device comprises at least one article accelerating nozzle defining a nozzle outlet directed in a direction inclined towards an article carrying surface of the conveyor and also towards the removal station. Pressurized gas passing from the nozzle operates against the trailing surfaces of leading articles as they move along the conveyor to accelerate them towards the removal station. As referred to in this specification, the term "lightweight articles" refers to articles of such weight, size and shape as to be moveable by air under pressure issuing from the nozzle whereby the articles are accelerated in the desired manner. Within the definition of lightweight articles are included cups or other containers of similar or smaller size and made by thermoforming from thermoplastic materials. With the use of the nozzle, it is essential also to use a guide means at the sides of the conveyor between the nozzle and the removal station to retain articles upon the conveyor.

In a preferred arrangement, air pressure reducing means is disposed at the side of the conveyor remote from its carrying surface and the conveyor has passages allowing for passage of air therethrough. This arrangement operates conveniently with the air nozzle and guide means as the lightweight articles, particularly when these are hollow, open articles such as cups, are retained upon the carrying surface with their open parts held against the carrying surface by suction. While this suction still retains the articles in position, gas from the nozzle urges the articles to move along the carrying surface. This relative movement causes the suction effect through the conveyor to be more readily relinquished upon the articles than would be the case if the articles were seated in one position upon the conveyor when reaching the removal station so there is a tendency for each article to be removed from the conveyor more quickly.

According to another preferred arrangement, an article abutment is provided in the removal station to prevent further movement of the article along the conveyor upon reaching the removal station. This abutment prevents articles from passing beyond the removal station and also serves to assist in breaking contact between the articles and conveyor and thus hasten the breakdown of the suction effect upon the articles created through the conveyor.

In order to facilitate the removal of the articles from the conveyor, and to achieve a smooth transition from the accelerating movement along the conveyor to the movement away from the conveyor during removal, the air pressure reducing means is effective along the conveyor to hold articles against the conveyor by suction up to, but not into, the removal station. Hence, upon articles reaching the removal station, they are no longer held against the conveyor by any external influence and may readily be removed therefrom.

The invention is not restricted to the apparatus having a single feed path. A plurality of side-by-side feed paths may be provided from the onput station to the removal station. A plurality of nozzles are then provided, one for each feed path and the nozzles are connected to a common gas supply. In this construction also, the means for removing articles extends across the conveyor to remove articles from each path.

The means for removing articles from each feed path conveniently comprises a tubular inlet member disposed in the removal station, and a suction-creating device for causing an air flow axially along the tubular inlet member from the direction of the conveyor carrying surface to draw articles into the inlet from the conveyor. When a plurality of side-by-side feed paths are provided, a plurality of tubular inlet members are provided, one for each feed path. It is preferable to have the or each inlet member as an axially adjustable sleeve to adjust the distance between said member and the article carrying surface of the conveyor. Where a plurality of inlet members are provided for an equal number of feed paths, the inlet members advantageously are carried by a common adjustable support which is moveable for moving the members, together, towards and away from the article carrying surface of the conveyor. Thus, leading articles from all of the feed paths are transferred simultaneously from the conveyor into the inlet members.

The suction-creating device has the effect of causing articles to be moved from the removal station under acceleration which assists in avoiding the possibility of interference between leading and succeeding articles in the removal station. The distance between the or each tubular inlet member and the conveyor is kept as short as possible which improves the reliability of the apparatus.

When a plurality of feed paths are provided, guide means is provided at the sides of each feed path to achieve reliable operation of the apparatus when using nozzles for the separating and feed accelerating device. Leading articles are hence accelerated from each feed path into the removal station with complete control over article movement and this control applies whether the leading articles are accelerated and removed simultaneously or whether they are removed from each feed path out of phase with the removal of other articles from other feed paths.

Optimum acceleration of the articles into the removal station and from the conveyor into the tubular inlet member is further assisted when the conveyor, towards and at the removal station, moves in a horizontal direction with the tubular inlet member disposed vertically. Thus, in order to accelerate the articles to the removal station, they are moved horizontally on the conveyor. During this time, they are held firmly seated on the conveyor by the air pressure reducing means which is extremely effective in holding lightweight articles such as cups. The horizontal conveyor may be disposed above or below the tubular inlet member or members. In one case, therefore, the article carrying surface of the conveyor is on its underside as it approaches the removal station and the articles are held against this surface by the air pressure reducing means; the tubular inlet member or members extend vertically downwards and the suction-creating device draws air vertically downwards from the carrying surface. Alternatively, the article carrying surface is disposed uppermost with the or each tubular inlet member extending vertically upwardly and the suction-creating device also acting upwardly. In this latter design, the tubular inlet member or members may lead into a curved delivery tube extending in the form of an arc and terminating in a vertical collecting and stacking tube for stackable lightweight articles. The latter tube may include control means for counting the articles in each stack so as to form batches of stacked articles which are then released from the tube in a downward direction.

Alternatively to the tubular inlet members, the means for removing articles from the conveyor is a removal conveyor having a flight extending from a position away from the transfer conveyor. The flight of the removal conveyor may be horizontal and extends from a downward vertical flight of the transfer conveyor. This vertical flight is preceded by a location at which the transfer conveyor changes in direction from a prior flight to the vertical flight. The at least one nozzle is directed at this prior flight to apply pressurized gas to leading articles to accelerate them towards said location, and the means for removing articles also includes at least one article removal nozzle directed at said conveyor location and at the vertical flight to effect a gas flow onto the removal conveyor from the transfer conveyor to draw articles onto the removal conveyor.

The invention also includes a method of transferring articles comprising disposing the articles in succession on a conveyor at an onput station, conveying said articles in succession along the conveyor towards a removal station, applying a force in the direction of travel of the conveyor to the articles as they move in succession towards the removal station to cause said articles to accelerate along the conveyor beyond the speed of the conveyor and thus increase their distances from succeeding articles, and removing said articles from the conveyor at the removal station.

Embodiments of the invention will now be described, by way of example, with reference to the accompanying drawings, in which.

Figure 1:
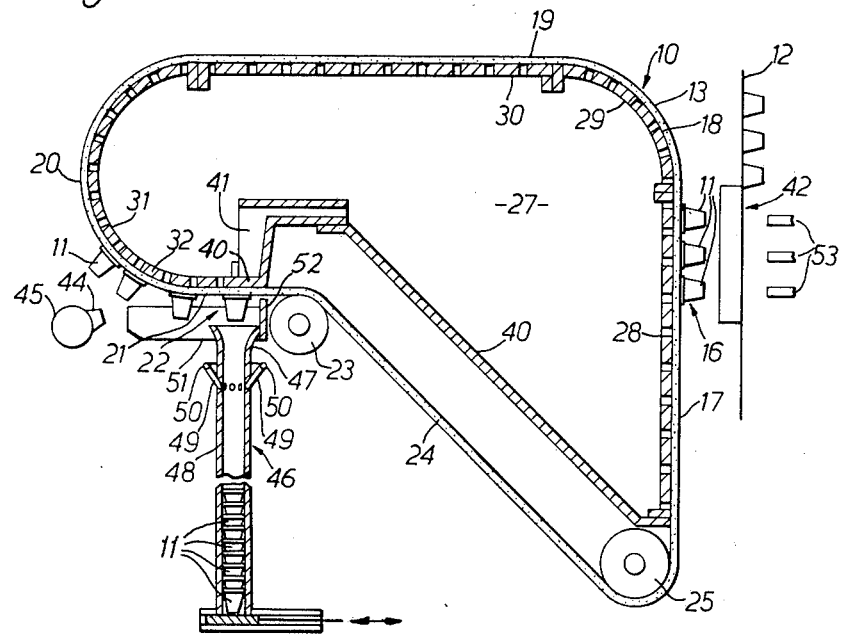
FIG. 1 is a side elevational view in cross-section of transfer apparatus according to a first embodiment.

In a first embodiment shown in FIG. 1, transfer apparatus 10 is provided for transferring lightweight articles, i.e. thermoplastic stackable cups, from a sheet 12 of thermoformed cups to a collecting and stacking device.

Figure 6:
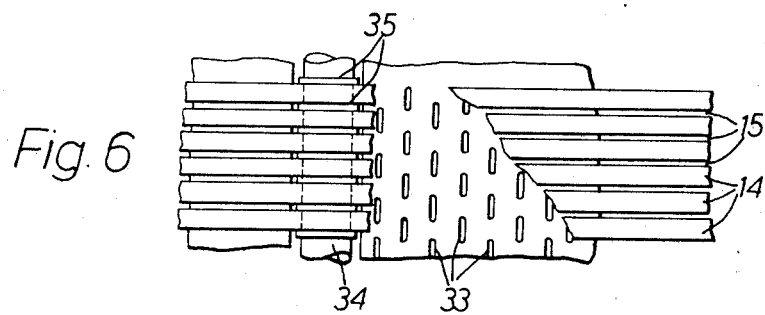
FIG. 6 is a plan view of part of a conveyor and supporting members of apparatus forming a modification of the apparatus of the first embodiment.

The transfer apparatus comprises an endless article transfer conveyor 13 which is either of air permeable construction or is formed as a plurality of side-by-side conveyor belts 14 as shown in a modification in FIG. 6.

The belts 14 are air impermeable and define between them, gaps 15 for the flow of air.

The conveyor 13 extends from an article onput station 16 positioned midway up a vertical flight 17 of the conveyor, upwards on an arcuate portion 18 which leads to a horizontal flight 19 and then to a semi-circular portion 20 leading to a short and lower horizontal flight 21 and to an article removal station 22 towards the output end of flight 21. The conveyor then extends around a conveyor tensioning roll 23 into a diagonal flight 24 around roll 25 to return to flight 17.

Figure 2:
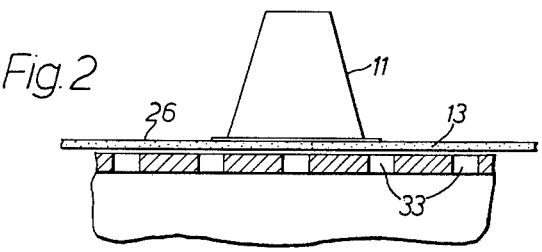
FIG. 2 is a side elevational view in cross-section of part of the apparatus of FIG. 1 but on larger scale.

Air pressure reducing means is provided for drawing air through the permeable conveyor to hold cups 11 to an article carrying surface 26 (i.e. the outward facing surface) of the conveyor as the cups are carried from onput station 16 into the removal station 22. This air pressure reducing means comprises a box 27 forming a suction chamber which is interconnected by air passages (not shown) to an air pressure reducing means (not shown) of known construction. As may be seen from FIG. 1, the box 27 is confined within the path of the endless conveyor and is airtight except for box walls 28, 29, 30, 31 and 32 which underlie, respectively, flight 17, portion 18, flight 19, portion 20 and flight 21 of the conveyor. The walls 28, 30 and 32 inclusive are formed with apertures 33 (FIG. 2) of any desired shape, e.g. circular or elongated as shown in FIG. 6, for the passage of air into the chamber 27 through the conveyor. In the modification of FIG. 6, lines of staggered slots orientated normal to the conveyor belt movement are provided as they ensure interconnection with the gaps 15 between the belts 14. This alignment is ensured in the modification of FIG. 6 by the use of carrier rolls 34 spaced at intervals along the path of the conveyor belts 14, the rolls 34 having axially fixed collars 35 which hold the belts laterally in position.

Figure 5:
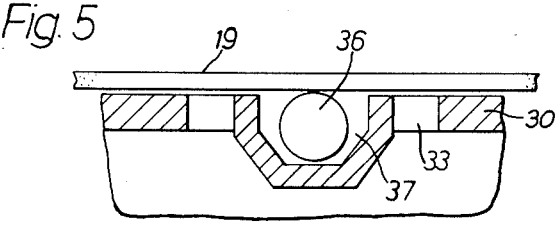
FIG. 5 is a view similar to FIG. 2 of yet a further part of the apparatus.
Figure 3:
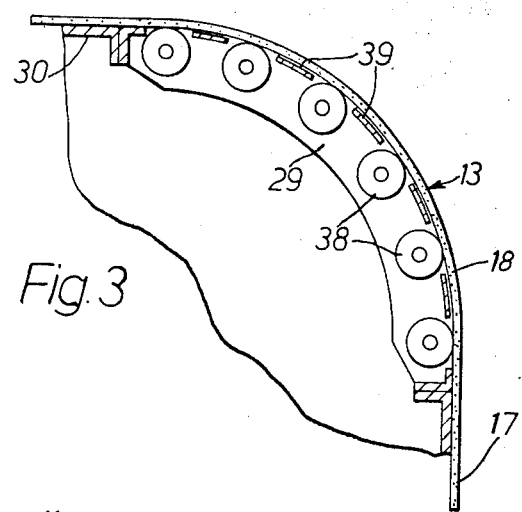
FIG. 3 is a view similar to FIG. 2 of another part of the apparatus.

For ease of movement of the conveyor 13 in the first embodiment, freely rotatable rolls 36 are disposed at intervals along the path of the conveyor. As shown in FIG. 5, the flight 19 is engaged by these rolls which are received into wells 37 formed in the box wall 30. If required, similar rolls (not shown) are provided in like manner in box walls 28 and 32 for flights 17 and 21. In box wall 29 (FIG. 3), freely rotatable rolls 38 are located closely together to support and shape the arcuate portion 18 of the conveyor to prevent it from engaging against box wall 29 which could otherwise create a frictional grip to stop conveyor movement.

In the wall 29, wall elements 39 are inserted between rolls 38 which project between the elements 39 to support the conveyor, the wall elements and rolls defining slots between them for the passage of air. The wall elements are made from wire mesh and serve to form in the wall 29, a more or less closed wall to the chamber 27 apart from the slots.

Although not shown in detail, the box wall 31 is of a construction similar to wall 29 with freely rotatable rolls and wall elements.

The box 27, including a non-perforate wall 40, is carried by a main structural member 41 which also supports the tensioning roll 23.

A thermoforming machine (not shown) for making the cups 11 in sheet 12, thermoforms the cups in five side-by-side longitudinally extending rows (one only being shown in the drawings). These cups are transferred to the onput station to the conveyor 13 by a severing device, shown generally by item 42, which may be of known construction. This device, in severing the cups, maintains them in their longitudinal rows or five feed paths 43 (FIG. 4) as they are fed towards and into the removal station 22.

Figure 4:
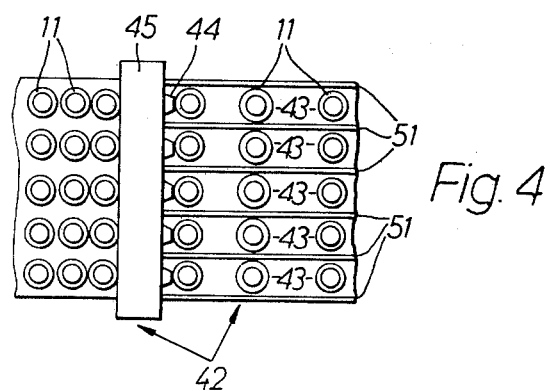
FIG. 4 is a view in the direction of arrow 'IV' in FIG. 1 of part of the apparatus and on the same scale of FIG. 1.

Because of the speed of operation of the thermoforming machine, the cups 11 are positioned along each feed path in such a close relationship that absolute control of the cups when being removed at the removal station would be impossible because of interference between succeeding cups at this station. To overcome this problem and according to the invention, an article separating and feed accelerating device is provided which comprises five laterally in-line article accelerating nozzles 44 positioned one beneath each feed path adjacent the downstream end of the semi-circular portion 20 of the conveyor (FIGS. 1 and 4). The nozzles are connected by a laterally extending pipe 45 (FIG. 4) for connection to a common pressurized air supply (not shown).

Each nozzle 44 has a single nozzle outlet which is directed in a direction inclined towards the article carrying surface of the conveyor and also towards the removal station for a reason to be described.

In the removal station, the main structural member 41 (FIG. 1) extends across the five feed paths and is impermeable so that the air is not drawn through the conveyor in this area and the cups are not held to the conveyor by suction.

In the removal station, means 46 is provided for removing cups from the conveyor. This means 46 comprises in respect of each feed path, a tubular inlet member 47 to a vertically downwardly extending collecting and stacking tube 48 for stacking cups and which is integral with inlet member 47. Tops of the inlet members are disposed a sufficient distance beneath the conveyor to give clearance to cups moving into the removal station. A suction-creating device is provided for each inlet member 47. This device comprises a plurality of passage defining means which are tubes 49, circumferentially spaced-apart around each inlet member 47 and extending through each inlet member at an angle inclined to the axis of the member and away from the conveyor to cause gas, in the form of air, to flow along the inlet member and away from the conveyor as will be described. The inlet members are in alignment laterally across the conveyor, one beneath each feed path and the tubes 49 are conveniently interconnected by two common pipes 50 which are connectable to a source of pressurized air.

At the two sides of each feed path, longitudinally extending guide means in the form of guide plates 51 are provided. These extend between the nozzle 44 positions and a laterally extending article abutment 42 which lies at the downstream end of the removal station to prevent further movement of cups along the feed path.

In use of the apparatus of the first embodiment, cups are urged horizontally onto the conveyor 13 at onput station 16 after being severed from the sheet 12 by plungers 53 which push the cups away from the sheet during cutting. The cups then held onto the carrying surface 26 by the suction applied through the conveyor are carried by the conveyor in close relationship with preceding and succeeding cups in each feed path.

The nozzle 44 project streams or a combined stream of pressurized gas in inclined fashion towards the conveyor. As each cup in each feed path is moved into this stream, the stream applies a force in the direction of travel of the conveyor to the cup thus causing it to accelerate beyond the conveyor speed as it approaches the removal station. The net effect of this application of force is that the cups are increased in distance from succeeding cups (see FIG. 4).

During movement of the cups under acceleration on the conveyor, they are nevertheless retained upon the conveyor by the suction effect therethrough and by the guide plate 51. Upon reaching the removal station, each cup is no longer subject to the suction effect because of the presence of part 40 of the non-perforated structure member 41 on the other side of the conveyor. Also, the abutment 52 upon engagement by the cups causes them to tilt to eliminate any residual suction effect. Thus, there is a tendency for the cups to fall. Each cup is, however, not permitted to fall under its own weight but to remove it as quickly as possible, it is subjected to a suction effect downwardly into its inlet member 47 created by the pressurized air passing through tubes 49 and down the inlet member and drawing air and cups from the conveyor. Upon reaching the lower regions of the stacking tube 48, the cups are stacked together ready for packaging, as shown in FIG. 1.

As may be seen from the above description, the nozzles 44 accelerate cups successively on each feed path and thus increase the distances between them on the conveyor. This enables sufficient time for each cup to be removed from the conveyor in the removal station before arrival of a succeeding cup which could otherwise interfere with it and cause a disruption in operation of the machine. In addition, the speed of cups removal is increased by the suction-creating device within the tube inlet members 47 which does not allow the already accelerated cups to slow down, but which causes instantaneous removal of each cup as it reaches the removal station and is no longer influenced by the suction effect holding it to the conveyor.

Figure 7:
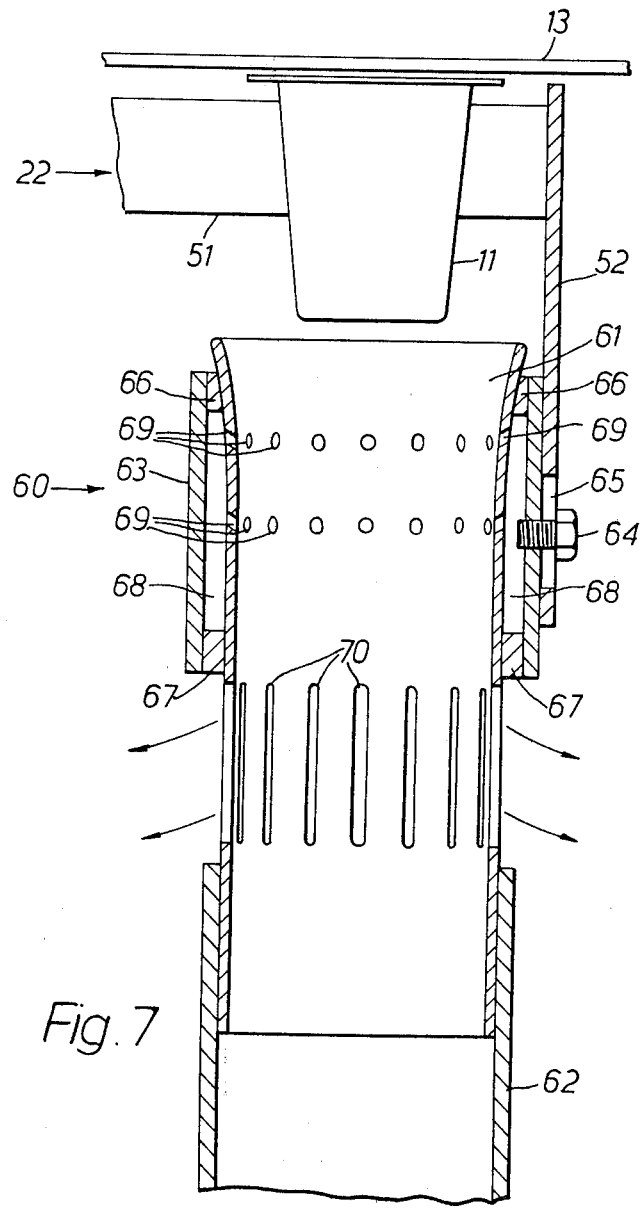
FIG. 7 is a cross-sectional side elevational view of parts of apparatus in a removal station area and forming a further modification of the first embodiment, and on a larger scale than FIG. 1.

In another modification of the first embodiment, as shown in FIG. 7, apparatus for transferring cups is as described in the first embodiment except for the construction of a means 60 for removing cups in the removal station 46.

The means 60 in the modification comprises, in respect of each feed path, a tubular inlet member 61 which is a sleeve which extends downwardly from the conveyor 13 and has a lower end telescopically received within the upper end of a vertically and horizontally fixed cup collecting and stacking tube 62. Five inlet members 61 are hence provided in spaced-apart relationships under the conveyor, one beneath each feed path.

The inlet members are axially adjustable together to vary their distance from the conveyor 13 to give clearance for the movement of cups of different heights into the removal station in the event that different cup sizes are to be made. To permit this adjustment, each inlet member is fixedly carried by a common adjustable box-like support 63 extending laterally of the conveyor, the support itself being vertically adjustable upon the abutment 52 by means of screws 64 (one being shown) having bodies slideably moveable along vertical adjustment slots 65 in the abutment when the screws are loosened. In order to facilitate the entry of cups 11, the upper ends of the inlet members 61 are slightly flared as shown in FIG. 7.

Upper and lower walls 66, 67 of the box-like member sealingly engage each of the inlet members which extend above and below these walls. For this purpose, the walls 66, 67 are made of a flexible material such as rubber. A chamber 68 defined within the box-like member and surrounding the inlet members is thus airtight. The chamber 68 is supplied with compressed air, by means not shown, and this compressed air passes through gas injection passages 69 spaced around each tubular inlet member in two rings, and passing through the wall thereof at an angle inclined to the axis of the member and away from the conveyor 13. The wall of each member 61 thus forms the passage defining means. Below the box-like member 63, each member 61 is formed with air outlet slots 70.

In use of the modified apparatus of FIG. 7 which is otherwise as described in the first embodiment, compressed air is forced through the passages 69 and flows downwardly of the inlet members to be released through the slots 70. The air flowing in the direction of the arrows, draws air through the top of each inlet member from the area of the conveyor and thus draws any cup in the removal station down the inlet member by suction. The cups are stacked at the bottom end of the stacking tube 62.

Figure 8:
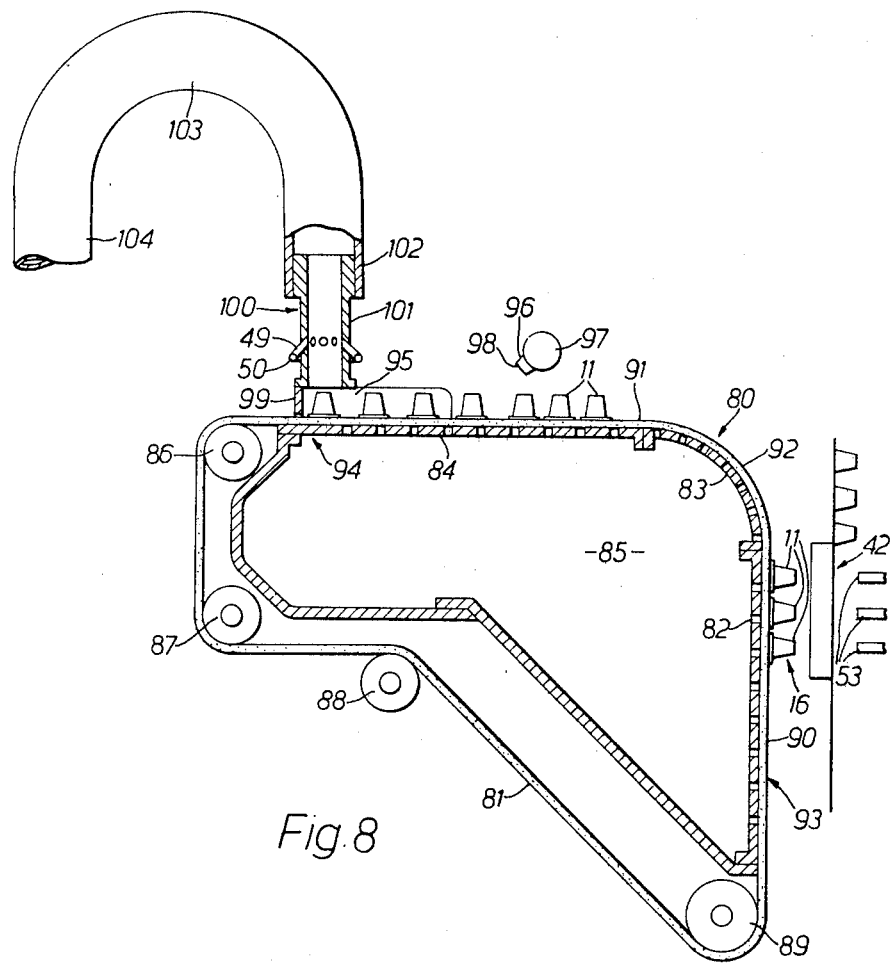
FIG. 8 is a view similar to FIG. 1 of a second embodiment.

In a second embodiment shown in FIG. 8, transfer apparatus 80 comprises a conveyor 81 of air permeable construction similar to that of the first embodiment. The conveyor 81 is passed in endless fashion around box walls 82, 83, 84 of a box 85 forming a suction chamber and then around rolls 86, 87, 88, 89. The box walls 82, 83, 84 are perforate in the otherwise airtight box and support by the means of rolls (not shown), flights 90 and 91 and arcuate portion 92 of the conveyor which extend between a cup onput station 93 and a removal station 94. Movement of the conveyor is initially vertically upwards from the onput station along flight 90 and is horizontal flight 91 in the removal station with the carrying surface of the conveyor uppermost.

Guide plates 95 lie at the sides of each of five feed paths of the conveyor from accelerating nozzles 96 which are positioned one above each feed path and are interconnected by a common air pipe 97. The nozzle outlets 98 point in inclined fashion towards the conveyor and in the direction of the removal station.

At the removal station, an abutment 99 extends across the conveyor. In this station, means 100 for removing cups from each feed path comprises a tubular inlet member 101 extending vertically upwards from the conveyor to a delivery tube 102 for cups which extends further upwardly and is formed in an arc 103 which terminates at an end remote from the tubular inlet member in a vertical collecting and stacking tube 104. Each inlet member 101 has a suction-creating device comprising tubes 49 and common interconnecting pipes 50 as described in the first embodiment.

In use of the apparatus of the second embodiment, cups are fed onto the conveyor at the onput station 93 by means (not shown) similar to that in the first embodiment. The cups then held onto the conveyor by suction are carried onto flight 91 and as they pass beneath the nozzles 96 they are accelerated into the removal station in the manner described in the first embodiment so as to increase distance between cups as shown in FIG. 8. Upon reaching the removal station 94, each cup may be disposed directly above a part of the box wall 84 which is not perforate so that the vacuum suction effect no longer operates upon it through the conveyor. Engagement with the abutment 99 tends to unseat each cup from the conveyor. Air being drawn up the inlet members 101 then sucks each cup up the delivery tube 102 and from there to the stacking tube 104.

Figure 9:
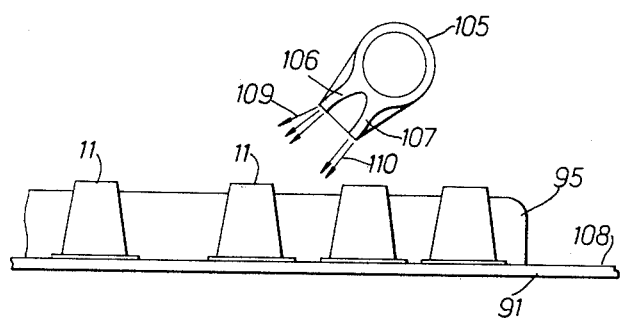
FIG. 9 is a cross-sectional side elevational view on a larger scale than FIG. 8 of a modification of the second embodiment.

In a modification of the second embodiment shown in FIG. 9, each nozzle 96 is replaced by a nozzle 105 having two nozzle outlets 106, 107. These nozzle outlets are at different angles of inclination to the carrying surface 108 of the conveyor so as to apply pressurized air to the trailing surface of each cup in positions spaced up the trailing surface from the carrying surface. As shown, outlet 106 provides a curtain of air 109 moving substantially along the conveyor belt in its direction of travel while outlet 107 produces a curtain of air 110 aimed at a high angle to the conveyor belt thereby serving to prevent cups from being blown over.

Figure 10:
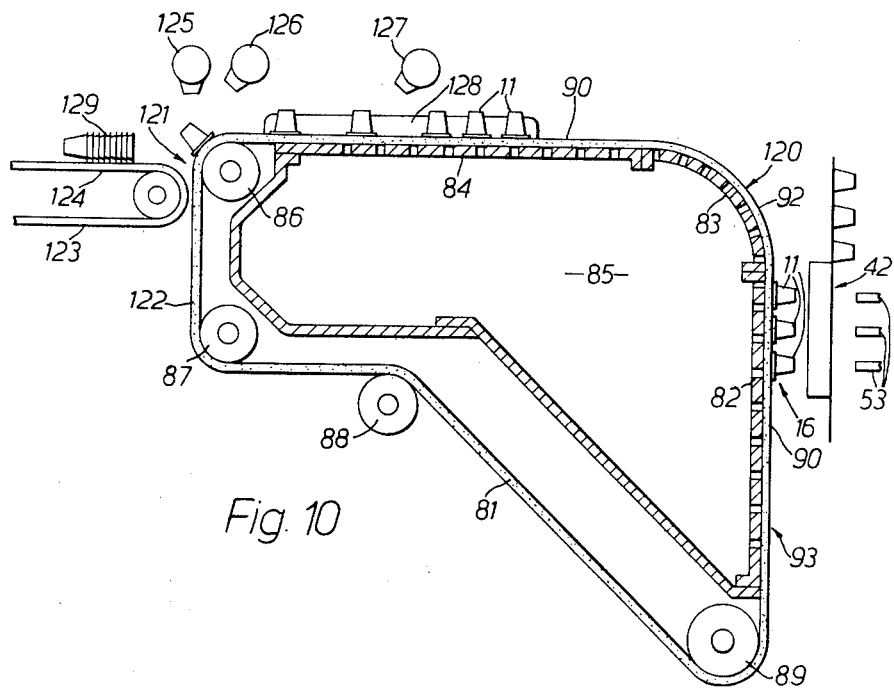
FIG. 10 is a view similar to FIG. 1 of a third embodiment.

In a third embodiment shown in FIG. 10, transfer apparatus 120 comprises a conveyor 81 passing around a box 85 and rolls which are all of the same construction as in the second embodiment. For these like parts, same reference numerals will be used as in the second embodiment.

In the third embodiment, the removal station is not disposed along the conveyor flight 91, but instead, is disposed at 121 slightly down a part of the conveyor 81 which extends downwardly from the horizontal plane of flight 91, i.e. around an arcuate conveyor portion to a vertical flight 122.

Means for removing cups from transfer conveyor 81 comprises a removal conveyor 123 having a horizontal flight 124 extending away from the conveyor 81 from a position adjacent the conveyor part 121, the flight 124 being slightly below flight 91. The means for removing cups also comprises two nozzles 125 and 126 directed, respectively, vertically downwards along conveyor part 121 and inclined across the part 121 and onto conveyor flight 124.

Means for accelerating and separating cups comprises a nozzle 127 having its outlet inclined to face along the flight 91 to urge cups towards the station 121.

In use of the apparatus of the third embodiment, cups fed along flight 91 are pushed forwardly by the nozzle 127 to accelerate them and separate them. Guides 128 at the sides of the feed path prevent lateral displacement of the cups which are otherwise held onto the conveyor by suction through the conveyor. Upon each cup passing beyond box wall 84, it is no longer subjected to suction and in passing around roll 86, it commences to fall under its own weight. The downward movement onto flight 124 is controlled by the combined effects of nozzles 125 and 126 which direct each cup around the roll 86, onto the flight 124 and then forwardly on the flight to join a stack 129 of cups being formed on the flight.

What is claimed is:

1. Transfer apparatus for conveying articles in succession along a feed path comprising transfer conveyor means extending from an article onput station where relatively lightweight articles are placed in a row on said conveyor means in relatively close succession to an article removal station, holding means for positively retaining said articles in said close succession along said conveyor means, an article separating and feed accelerating device disposed in a position intermediate the onput and removal stations, said device being operable and disposed to apply a force in the direction of travel of the conveyor means, in succession to each of the leading articles moving along the conveyor means to overcome said holding means sufficiently to cause each said leading article to accelerate in turn beyond the speed of the conveyor means along the conveyor means towards the removal station and thus to successively increase the distance between each leading article and the next succeeding article, and means for removing said separated articles in succession from the conveyor means at said removal station, said articles being held in said close succession on said conveyor means by suction means as they move toward said separating and feed accelerating device, and said device comprising means for directing air under pressure against the leading article in such direction and with sufficient force to overcome the suction holding action sufficiently to displace the leading article along said conveyor means to effect said separation.

2. Apparatus for conveying lightweight articles according to claim 1 wherein the article separating and feed accelerating device comprises at least one article accelerating nozzle defining a nozzle outlet directed in a direction inclined towards the article carrying surface of the conveyor means and also towards the removal station, said nozzle being connectable to a source of pressurized gas to direct the pressurized gas in said inclined direction and thus to trailing surfaces of each leading article as it moves along the conveyor means, the apparatus also comprising guide means provided at the sides of the feed path and between the nozzle and the removal station to retain articles laterally upon the conveyor means.

3. Apparatus according to claim 2 having a plurality of side-by-side feed paths on the conveyor means, and each feed path is provided with at least one nozzle, the nozzles being connected to a common gas supply.

4. Apparatus according to claim 2 wherein said nozzle has at least two nozzle outlets, said outlets having different angles of inclination to the carrying surface of the conveyor means so as to apply pressurized gas to the trailing surface of each article in positions spaced along the trailing surface from the conveyor carrying surface.

5. Apparatus according to claim 2 wherein said nozzle is located to accelerate each article into the removal station and an article abutment is disposed at the removal station to prevent further movement of the article along the conveyor means upon the article reaching the removal station.

6. Apparatus according to claim 2 wherein the means for removing articles from the conveyor means has a tubular inlet member disposed in the removal station, and there is a suction-creating device for causing a gas flow along said tubular inlet member away from the article carrying surface of the conveyor means to draw articles into the inlet member from the conveyor means.

7. Apparatus according to claim 6 wherein the conveyor means towards and at the article removal station, moves in a horizontal direction and the tubular inlet member is disposed vertically.

8. Apparatus according to claim 7 wherein the conveyor means, at the article removal station, has its article carrying surface on the underside and the tubular inlet member is disposed beneath and extends downwardly from the article carrying surface, and the conveyor means is provided with passages for flow of air from its article carrying surface to the side of the conveyor remote from the article carrying surface, the apparatus further comprising air pressure reducing means disposed at said remote side and operable to draw air through the conveyor means and hold articles against the carrying surface by a suction effect as the conveyor means moves towards the removal station.

9. Apparatus according to claim 7 wherein the conveyor means, at the article removal station, has its article carrying surface on the upper side of the conveyor means and the tubular inlet member is disposed above and extends upwardly from the article carrying surface.

10. Apparatus according to claim 9 wherein the means for removing articles from the conveyor means further comprises a delivery tube for passage of articles extending upwardly from the tubular inlet member, the delivery tube being in the form of an arc and terminating at an end remote from the tubular inlet member in a vertical collecting and stacking tube for the articles.

11. Apparatus according to claim 6 wherein the tubular inlet member comprises an axially adjustable sleeve to adjust the distance between said member and the article carrying surface of the conveyor means.

12. Apparatus according to claim 6 wherein the suction creating device comprises a plurality of circumferentially spaced-apart passage defining means which provide gas injection passages extending into the tubular inlet member at an angle inclined to the axis of the inlet member and away from the conveyor means to cause a gas flow along the inlet member away from the conveyor means and draw articles into the inlet member.

13. Apparatus according to claim 12 wherein there are a plurality of side-by-side feed paths on the conveyor means and a plurality of tubular inlet members and suction-creating devices are provided, one for each feed path, the tubular inlet members being spaced-apart across the conveyor means and being carried by a common adjustable support for moving the members, together, towards and away from the article carrying surface of the conveyor means.

14. Apparatus according to claim 13 wherein the adjustable support is a box-like member and the gas injection passages of each tubular inlet member open into a chamber defined by the box-like member, said chamber being connectable to a source of pressurized gas for passage of gas to the injection orifices.

15. Apparatus according to claim 2 wherein the conveyor means is provided with passages for the flow of air from its article carrying surface to the side of the conveyor means remote from the article carrying surface, the apparatus also comprising air pressure reducing means disposed at said remote side of the conveyor means and operable to draw air through the conveyor means and hold articles against the carrying surface by a suction effect as the conveyor means moves towards the removal station.

16. Apparatus according to claim 15 wherein the conveyor means is permeable to flow of air.

17. Apparatus according to claim 15 wherein the conveyor means comprises two or more side-by-side conveyor belts which define gaps between them, the gaps defining the passages for flow of air.

18. Apparatus according to claim 15 wherein the conveyor means in passing from the onput to the article removal stations changes in angular orientation to a horizontal plane.

19. Apparatus according to claim 18 wherein at the output station the conveyor means extends substantially vertically and the air pressure reducing means is operable to retain the articles against the vertically disposed article carrying surface.

20. Apparatus according to claim 18 wherein rotatable support members are provided to support the conveyor means as it changes in angular orientation, said rotatable support members having gaps defined around them for the passage of air through the conveyor means as as effected by the air pressure reducing means.

21. Apparatus according to claim 18 wherein the article removal station is disposed at a position along a part of the conveyor means which extends downwardly from a horizontal plane, and the means for removing articles from the conveyor comprises a removal conveyor having a flight extending from a position away from the transfer conveyor means.

22. Apparatus according to claim 21 wherein said flight of the removal conveyor is substantially horizontal, said at least one nozzle being directed at a flight of the transfer conveyor means prior to said conveyor part to apply gas under pressure to leading articles to accelerate them in succession towards said part, and the means for removing articles also includes at least one article removal nozzle directed at said conveyor means to effect a gas flow toward the removal conveyor from the transfer conveyor to displace articles onto the removal conveyor.

23. The apparatus defined in claim 1 wherein there is provided at said removal station a holding release region wherein said suction holding action is removed or at least greatly weakened, and suction means is provided at said removal station for effecting removal of released articles from the conveyor means.

24. Transfer apparatus for conveying articles in succession along a feed path comprising a moving transfer conveyor extending from an article output station of the conveyor to an article removal station; suction means for drawing air through said conveyor to hold the articles by suction in spaced relation on the said conveyor during conveying, said suction means extending effectively on said conveyor from said onput station to the inlet region of the said removal station and being constructed and arranged to avoid suction effect upon said articles within the said removal station; an article separating and feed accelerating device disposed in operative association with said conveyor in a position before the said inlet region of the removal station, said device being operable and oriented to apply a pressurized air stream in the direction of travel of the moving conveyor, in succession to articles along the moving conveyor to cause the said articles while held on the conveyor by the holding action of the said suction means to accelerate in turn along the conveyor beyond the speed of the conveyor towards the removal station and within said inlet region and thus to increase their distances from succeeding articles when at the removal station and before becoming free of the said suction effect; and a removal device within the said removal station comprising pneumatic means adapted and disposed to take off each separated article from the said conveyor.

25. A method of transferring articles comprising disposing the articles in spaced succession on a moving conveyor at an onput station; said articles being conveyed towards a removal station, continuously holding the said articles on the said conveyor by suction, applying pressurized air stream force in the direction of travel of the moving conveyor to the articles while said holding suction is effective as they approach in succession towards the inlet region of the said removal station to cause said articles to accelerate in turn along the conveyor beyond the speed of the conveyor and thus increase their distances from succeeding articles on the conveyor, reducing or eliminating the suction holding the articles on the conveyor and removing the said separated articles from the conveyor under pneumatic effect at the said removal station.

26. Transfer apparatus for conveying articles in succession along a feed path comprising transfer conveyor means extending from an article onput station where relatively lightweight articles are placed in a row on said conveyor means in relatively close succession to an article removal station, holding means for positively retaining said articles in said close succession along said conveyor means, an article separating and feed accelerating device disposed in a position intermediate the onput and removal stations, said device being operable and disposed to apply a force in the direction of travel of the conveyor means, in succession to each of the leading articles moving along the conveyor means to overcome said holding means sufficiently to cause each said leading article to accelerate in turn beyond the speed of the conveyor means along the conveyor means towards the removal station and thus to successively increase the distance between each leading article and the next succeeding article, and means for removing said separated articles in succession from the conveyor means at said removal station, said article separating and feed accelerating device comprising at least one article accelerating nozzle defining a nozzle outlet directed in a direction inclined towards the article carrying surface of the conveyor means and also towards the removal station, said nozzle being connectable to a source of pressurized gas to direct the pressurized gas in said inclined direction and thus to trailing surfaces of each leading article as it moves along the conveyor means, and the apparatus also comprising guide means provided at the sides of the feed path and between the nozzle and the removal station to retain articles laterally upon the conveyor means.

27. Apparatus according to claim 26, wherein the conveyor means is provided with passages for the flow of air from its article carrying surface to the side of the conveyor means remote from the article carrying surface, the apparatus also comprising air pressure reducing means disposed at said remote side of the conveyor means and operable to draw air through the conveyor means and hold articles against the carrying surface by a suction effect as the conveyor means moves towards the removal station.

* * * * *

UNITED STATES PATENT AND TRADEMARK OFFICE
CERTIFICATE OF CORRECTION

PATENT NO. : 4,304,508
DATED : December 8, 1981
INVENTOR(S) : Peter Wolf

It is certified that error appears in the above—identified patent and that said Letters Patent are hereby corrected as shown below:

Column 11, claim 12, line 2, change "tioncreating" to --tion-creating--.

Column 11, claim 19, line 2, change "output" to --onput--.

Signed and Sealed this

Sixth Day of April 1982

|SEAL|

Attest:

GERALD J. MOSSINGHOFF

Attesting Officer      Commissioner of Patents and Trademarks